July 18, 1950

J. W. BRISCOE 2,515,491

CONCRETE BLOCK MOLDING MACHINE

Filed July 31, 1948

INVENTOR:
J W BRISCOE
BY O O Martin
ATTORNEY.

July 18, 1950  J. W. BRISCOE  2,515,491
CONCRETE BLOCK MOLDING MACHINE
Filed July 31, 1948  4 Sheets-Sheet 3

INVENTOR:
J. W. BRISCOE
BY
O. O. Martin
ATTORNEY.

July 18, 1950 J. W. BRISCOE 2,515,491
CONCRETE BLOCK MOLDING MACHINE
Filed July 31, 1948 4 Sheets-Sheet 4

INVENTOR:
J. W. BRISCOE
BY
O O Martin
ATTORNEY

Patented July 18, 1950

2,515,491

UNITED STATES PATENT OFFICE 2,515,491

CONCRETE BLOCK MOLDING MACHINE

James W. Briscoe, Los Angeles, Calif.

Application July 31, 1948, Serial No. 41,735

5 Claims. (Cl. 25—56)

This invention relates to hydraulic means for producing hollow building blocks and has for its main object to provide a machine of this type which is substantially automatic in its operation.

Hollow building blocks, such as commonly used in present-day building practice, are usually molded from concrete or other finely comminuted material and the blocks most favored and best suited for building purposes are of the so-called interlocking variety. The present device is designed to produce such interlocking blocks. The various objects of the invention, together with the many advantageous features thereof will be better understood from the following detailed description and by referring to the accompanying drawings of which:

Figure 3:
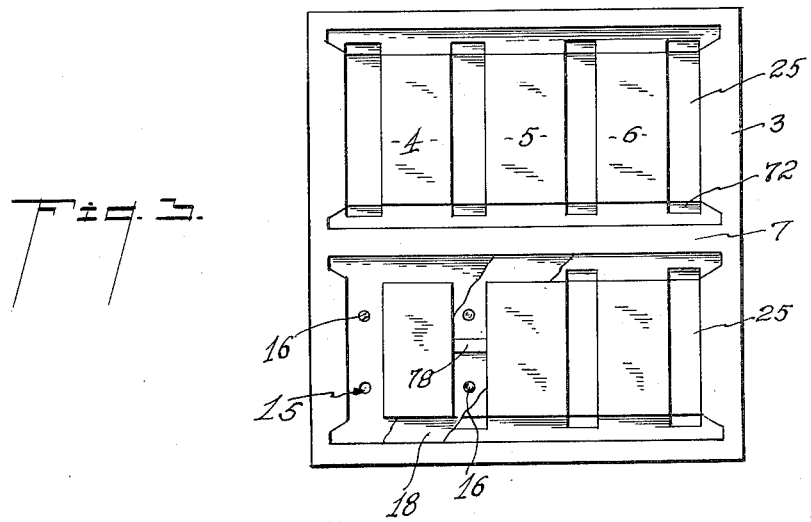
Figs. 3 and 4 are plan views of the mold of the device, together with other parts thereof as will be described presently.
Figure 4:
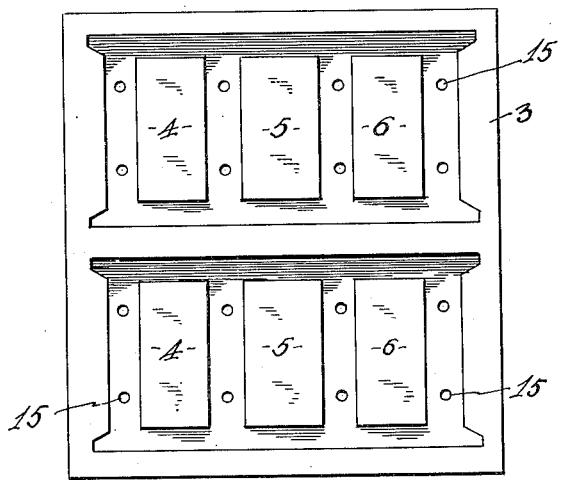
Figure 11:
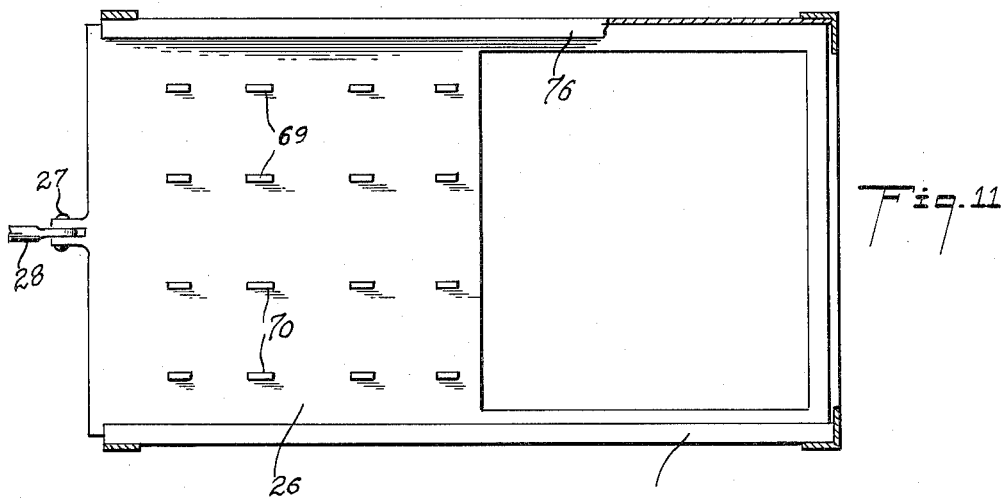
Figure 12:
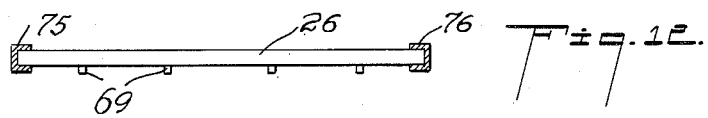

Figs. 5 to 8, inclusive, are detail views of the parts shown in the molds of Figs. 3 and 4 as they appear when removed therefrom;

Figs. 9 and 10 are, respectively, an isometric view of a completed building block and a cross-sectional end view thereof; and Figs. 11 and 12 illustrate further details of construction, the importance of which is hereinafter fully described.

In a frame 1 is mounted a hopper 2 and a mold is placed below this hopper for vertical movement relative thereto. The mold comprises a rectangular casing 3 within which are seated cores 4, 5 and 6. As shown in Fig. 4, the casing is by a central partition 7 divided into two compartments and it is to be noted that similar cores are placed within each compartment. It is also important to note that both compartments, as well as the devices placed within the two compartments, may be and preferably are exactly alike. The following description is, for this reason generally limited to one compartment or the parts therein and it is to be understood that it pertains as well to the others. The casing is centrally supported on a cylindrical member 8 which constitutes the rod of a piston 9 and the latter is mounted for sliding movement within a cylinder 10.

Figures 6, 8:
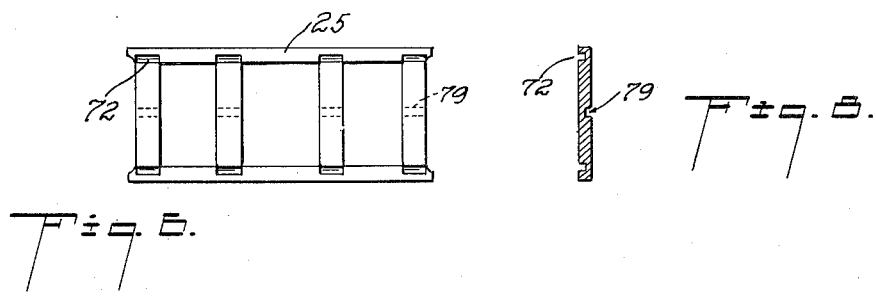
Figures 5, 7:
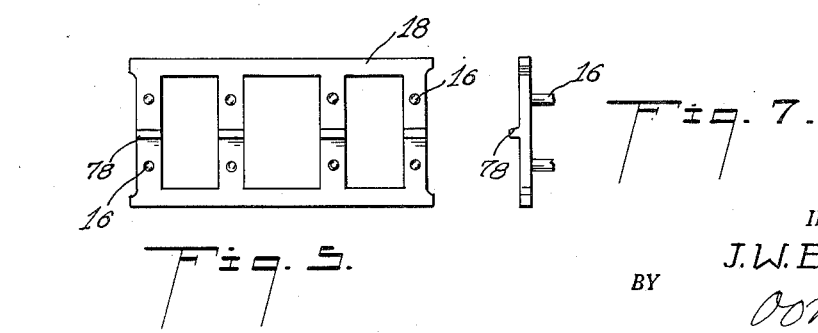

The bottom of the casing is perforated as indicated at 15, see also Fig. 3, to receive a series of rods 16 and the latter are at the bottom thereof anchored in a platform 17. A pair of plates 18 is secured to the upper end of these rods and these plates are, as indicated in Figs. 3 and 5, shaped to fit loosely within the compartments of the casing for vertical sliding movement therein. The platform 17 is supported on rods 19, 20, of pistons 21, 22, which ride within cylinders 23, 24, and the latter are mounted on brackets of the framing. The plates 18 serve to support pallets 25 which, as indicated in Fig. 6, are substantially identical with the plates in general configuration and which, like the plates, are freely seated within the casing for vertical movement therein.

Figure 1:
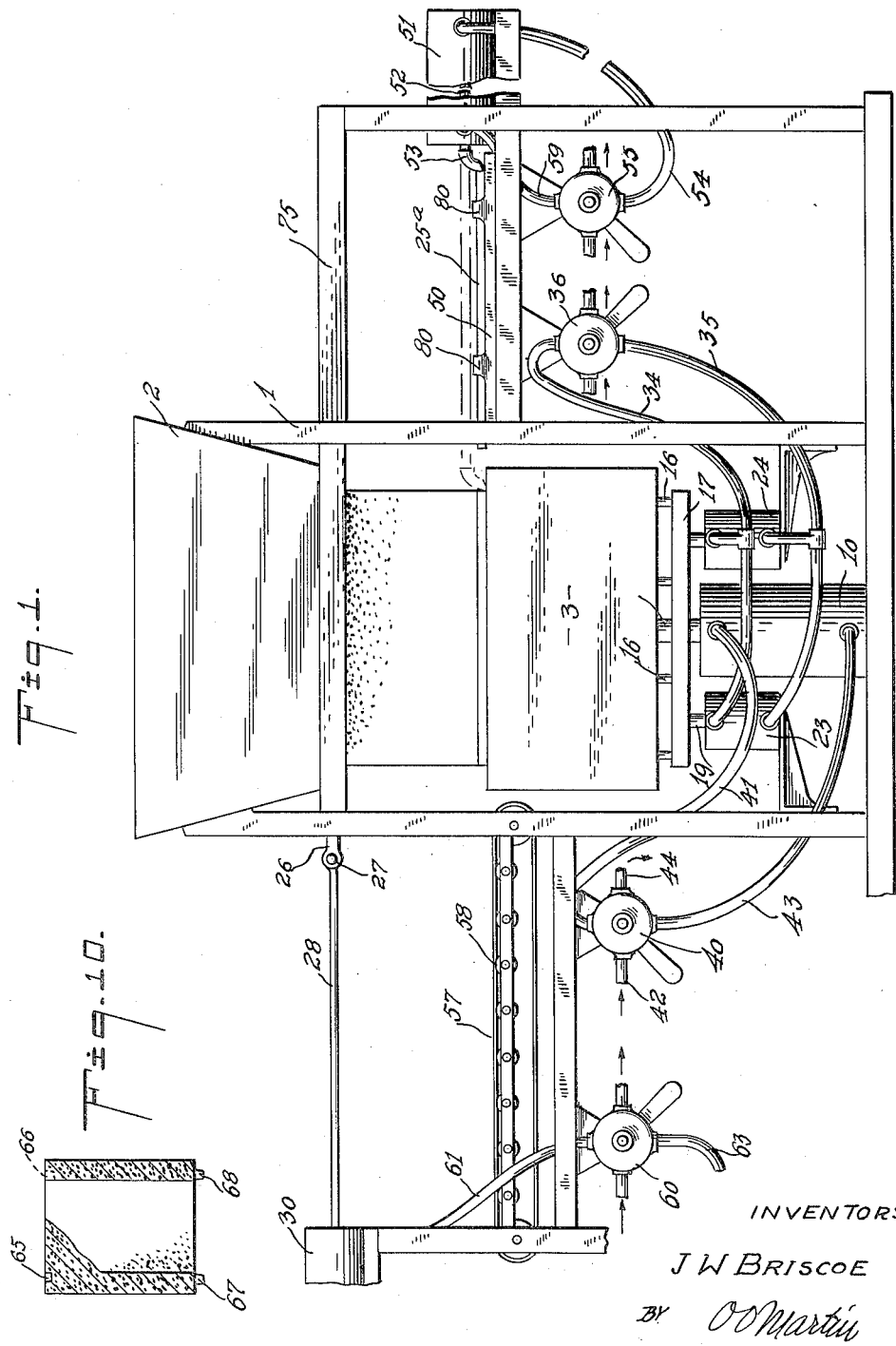
Fig. 1 is a side elevational view of a block molding machine embodying the invention.

Reference is now invited to Fig. 1 of the drawings, in which the device of my invention is shown in position to receive a charge of concrete. It is important to note that the bottom of the hopper is held closed by a slide 26 to prevent the plastic concrete, with which the hopper is filled, from discharging therefrom until the machine has been adjusted to receive a charge of concrete. The slide is at 27 shown connected to a rod 28 which extends from the piston 29 of a cylinder 30 and it is, in a manner which will be described presently, moved in the direction of the arrow of Fig. 2 to uncover the bottom opening of the hopper and so to permit the plastic concrete by gravity to flow into the spaces surrounding the cores 4, 5, 6 of the mold.

The consistency of the concrete mixture should be so as to cause it to flow freely and to settle within and completely fill the open spaces within the casing. It may, for the purpose of facilitating the settling of the mixture and also in order to insure more perfect uniformity thereof, be found advisable to provide means to induce settlement of the concrete through the hopper, but as such devices are commonly used, it is not thought necessary to make further mention thereof in this description. The slide 26 is returned to its initial position when the mold has received its charge thereby again to close the bottom opening of the hopper. The mechanism by means of which the slide is operated includes a valve 60 from which a conduit 61 extends to the space in front of the piston 29 and a second conduit 63 communicates with the space behind the piston. This valve may be manually operated to carry fluid under pressure through one conduit or the other to effect the movements of the slide.

Figure 2:
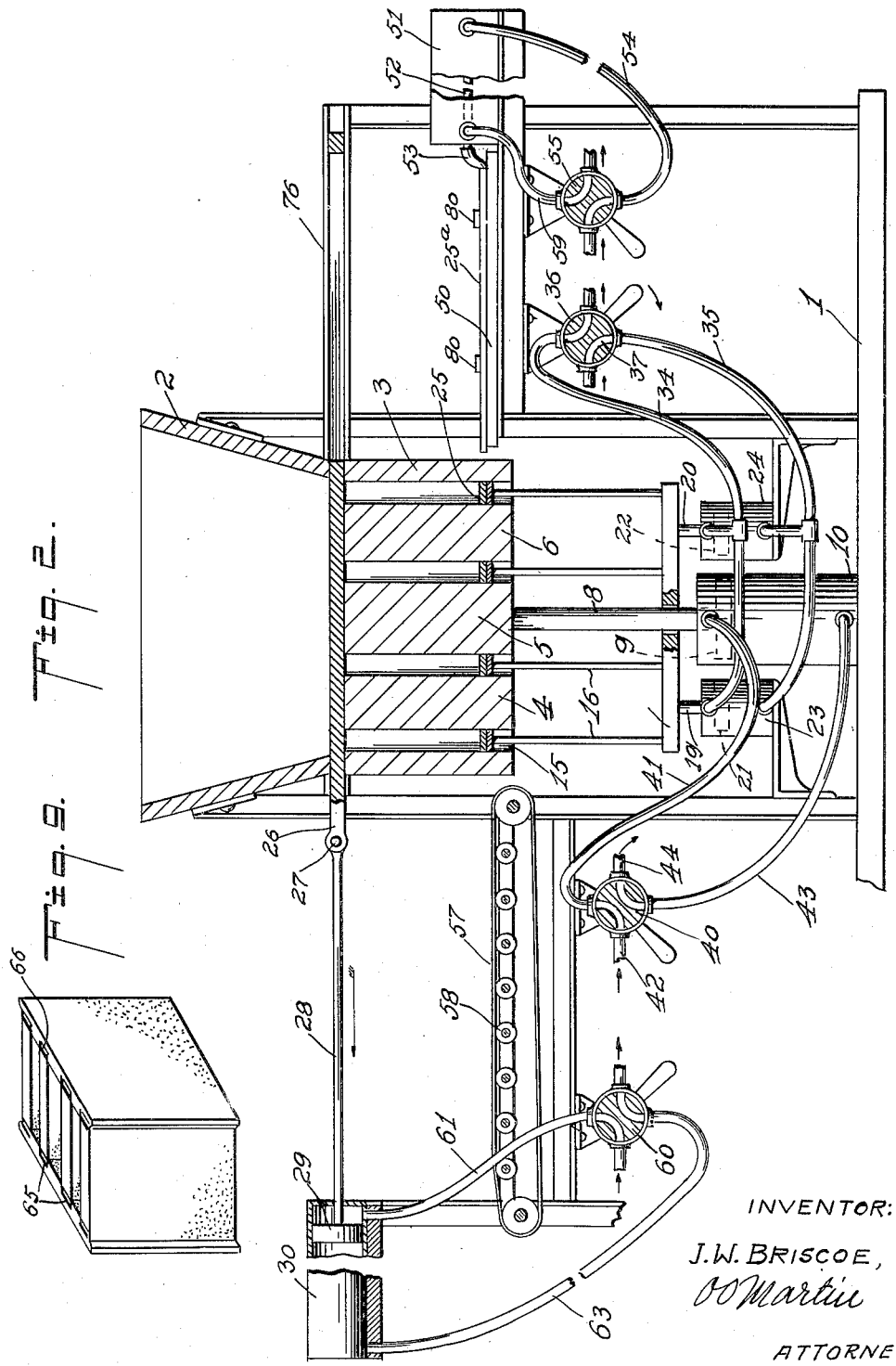
Fig. 2 is a substantially corresponding view showing the device in a different position of adjustment and with portions thereof broken away for the sake of clearness.

The cylinders 23, 24 are by means of conduits 34, 35 connected with a valve 36, which latter is manually operable to open a passage through a port 37 thereby to carry fluid under pressure from a suitable source (not shown) to the underside of the pistons 21, 22 and thereby to elevate the platform and the parts supported thereon into the position shown in Fig. 2, during which movement it is found that the concrete within the mold becomes compressed as required for the purpose of the invention.

Once the molds have been filled and compressed, it becomes necessary to lower the casing into the position shown in Fig. 1. A valve 40 is, for this purpose, by a conduit 41 connected with the space above the piston 9 of the cylinder 10 to admit fluid under pressure through a conduit 42 to the space above the piston and it is noticed that a conduit 43 carries fluid from below the piston through the valve and a conduit 44 back to the reservoir from which the fluid was taken. During this movement of the casing, the valve 36 may be turned to cause pressure fluid to flow through the passage 37 and the conduit 34 to spaces above the pistons 21, 22 thereby to depress these pistons and so to return the plates 18 to their original position.

The casing is, in Fig. 1, shown in this lowered position and it is noticed that the top surface of the plate 18 in this position, is aligned with the top surface of the casing; also that the pallet 25 rests on top of the plate above the surface of the casing. It is now noticed that a second pallet 25ª rests on a table 50 in continued alignment with the pallet 25. A cylinder 51 is mounted on the frame adjacent this table and the piston rod 52 of this cylinder is fitted with a finger 53, the outer end of which is downwardly bent to engage the edge of the pallet 25ª. From the rear end of this cylinder extends a conduit 54 to a valve 55 and the latter is set to carry fluid under pressure through the conduit 54 to the cylinder thereby to advance the piston rod to cause the finger 53 to move the pallet 25ª into contact with the edge of the pallet 25 and subsequently to move both pallets until the pallet 25ª reaches a position of registration with the mold. The pallet 25 is, at the same time, delivered to a conveyor 57 which is suitably connected for movement in direction of the arrow, thereby to carry the pallet 25 and the finished concrete block supported thereon away from its position below the hopper. The upper reach of the conveyor 57 is shown supported on a series of freely rotatable rollers 58 in order to facilitate movement of the concrete filled pallet thereon.

Once the pallet 25ª has been placed in position on the plate 18, it becomes necessary to reverse the valve 55 to cause a pressure fluid to flow through a conduit 59 to the space in front of the piston within the cylinder 51 thereby to move the piston back into its initial position. Another pallet may then be placed on the table 50. The valve 40 is now reversed to cause the fluid to pass through the conduit 43 into the space within the cylinder 10 below the piston 9, thereby to cause the latter to rise and to move the casing of the mold back into its initial position. As the casing reaches its elevated position, it is necessary again to lower the plate 18, with the new pallet, to its initial position.

The cylinder 30, which, as stated, by means of the conduit 61 is connected with the valve 60 to carry fluid under pressure from the conduit 62 to the space within the cylinder in front of the piston again moves the slide 26 in the direction of the arrow to open the bottom of the hopper and so to afford the concrete mixture therein time to flow into the mold. The valve 60 is thereupon reversed again to cause the fluid to flow through the conduit 63 to the space behind the piston 29 thereby to return the slide to its initial position and so to close the bottom of the hopper. This completes the cycle of operation of the device.

The concrete block in this manner molded and finished is, in Figs. 9 and 10, shown provided in the top surface thereof with recesses 65, 66 and it is important to note that ribs 67, 68 project from the bottom of the block in continued alignment with these recesses. In order to make it possible to produce these pockets and projections during the forming of the block, it is necessary to project similar ribs 69, 70 from the bottom surface of the slide 26, substantially as indicated in Figs. 11 and 12. The pallets must also be made with recesses 71, 72 which, when the pallets are seated within the casing and the slide is in hopper closing position, are in vertical alignment with the ribs of the slide.

Grooved guides 75, 76 are secured to the framing in position to guide the slide and to maintain it correctly positioned between the hopper and the mold. It is also necessary properly to guide the pallets in their passage to the plates 18. The latter may, for this purpose, be made with ribs 78 lengthwise extending through the center of the upper surface thereof and of a size to seat in grooves 79 of the pallets. In addition it may be found advisable to place suitable guide members 80 on the table 50.

I claim:

1. In a concrete block molding machine having a vertically movable pallet carrying mold and a concrete receiving hopper, in combination, a pallet receiving table, means for advancing a pallet from said table to a position above said mold while the latter is in its lowered position thereby to align the pallet for settling movement within the mold, a support for the pallet in the mold, means for moving said support to elevate the pallet within the mold after the latter has again been elevated thereby to compress a charge of concrete delivered from the hopper to the mold, means for returning said support with its pallet and the compressed charge of concrete thereon to its initial position during the subsequent lowering movement of the mold for horizontal alignment with a pallet on said pallet advancing means, advance movement of said second pallet causing the block carrying product to slide away from its support.

2. In a concrete block molding machine having a vertically movable pallet carrying mold and a concrete receiving hopper, in combination, a pallet receiving table, means for advancing a pallet from said table to a position above said mold while the latter is in its lowered position thereby to align the pallet for settling movement within the mold, a support for the pallet in the mold, means for moving said support to elevate the pallet within the mold after the latter has again been elevated thereby to compress a charge of concrete delivered from the hopper to the mold, means for returning said support with its pallet and the compressed charge of concrete thereon to its initial position during the subsequent lowering movement of the mold for horizontal alignment with a pallet on said pallet advancing means, advance movement of said second pallet causing the block carrying product to slide away from its support, and means for transporting the block carrying pallet away from the machine.

3. In a concrete block molding machine having a vertically movable pallet carrying mold and a concrete receiving hopper, in combination, a pallet receiving table, a plunger, means for moving said plunger to advance a pallet from said table to a position above said mold while the latter is in its lowered position thereby to align the pallet for settling movement within the mold, a support for the pallet in the mold, means for moving said support to elevate the pallet within the mold after the latter has again been elevated thereby to compress the charge of concrete delivered from the hopper to the mold, means for returning said support with its pallet and the compressed charge of concrete thereon to its initial position during the subsequent lowering movement of the mold for horizontal alignment with the pallet on said pallet advancing means, repeated movement of said plunger to advance said second pallet causing the block carrying pallet to slide away from its support.

4. In a concrete block molding machine having a vertically movable pallet carrying mold and a concrete receiving hopper, in combination, a pallet receiving table, a plunger, means for moving said plunger to advance a pallet from said table to a position above said mold while the latter is in its lowered position thereby to align the pallet for settling movement within the mold, a support for the pallet in the mold, means for moving said support to elevate the pallet within the mold after the latter has again been elevated thereby to compress the charge of concrete delivered from the hopper to the mold, means for returning said support with its pallet and the compressed charge of concrete thereon to its initial position during the subsequent lowering movement of the mold for horizontal alignment with the pallet on said pallet advancing means, repeated movement of said plunger to advance said second pallet causing the block carrying pallet to slide away from its support, and means for transporting the block carrying pallet away from the machine.

5. In a concrete block molding machine having a vertically movable pallet carrying mold and a concrete receiving hopper, in combination, a pallet receiving table, means for advancing a pallet from said table to a position above said mold while the latter is in its lowered position thereby to align the pallet for settling movement within the mold, a support for the pallet in the mold, means for moving said support to elevate the pallet within the mold after the latter has again been elevated thereby to compress a charge of concrete delivered from the hopper to the mold, means for returning said support with its pallet and the compressed charge of concrete thereon to its initial position during the subsequent lowering movement of the mold for horizontal alignment with the pallet on said pallet advancing means, advance movement of said second pallet causing the block carrying product to slide away from its support, and a conveyor in horizontal alignment with said second pallet for transporting the block carrying pallet away from the machine.

JAMES W. BRISCOE.

REFERENCES CITED

The following references are of record in the file of this patent:

UNITED STATES PATENTS

| Number | Name | Date |
|---|---|---|
| 1,330,172 | Crozier | Feb. 10, 1920 |
| 1,695,327 | Goldston | Dec. 18, 1928 |
| 1,716,349 | Wallace | June 4, 1929 |
| 1,796,636 | Toulmin, Jr. | Mar. 17, 1931 |
| 2,120,943 | Schutz | June 14, 1938 |
| 2,231,064 | Fearn | Feb. 11, 1941 |